US012060101B2

(12) United States Patent
Su et al.

(10) Patent No.: US 12,060,101 B2
(45) Date of Patent: Aug. 13, 2024

(54) BASKET AND STROLLER WITH THE BASKET

(71) Applicant: WONDERLAND SWITZERLAND AG, Steinhausen (CH)

(72) Inventors: Yuya Su, Taipei (TW); Iting Yeh, Taipei (TW); Lingyi Lo, Taipei (TW); Lichen Wang, Taipei (TW); Kwanghao Liu, Taipei (TW); Xiong Yu, Guangdong (CN); Qiang Yang, Guangdong (CN); Bo Wu, Guangdong (CN); Nengzhi Li, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 177 days.

(21) Appl. No.: 17/513,208

(22) Filed: Oct. 28, 2021

(65) Prior Publication Data
US 2022/0126905 A1 Apr. 28, 2022

(30) Foreign Application Priority Data
Oct. 28, 2020 (CN) .......................... 202022440002.6

(51) Int. Cl.
*B62B 9/26* (2006.01)
*B62B 9/12* (2006.01)

(52) U.S. Cl.
CPC . *B62B 9/26* (2013.01); *B62B 9/12* (2013.01)

(58) Field of Classification Search
CPC .................................... B62B 9/26; B62B 9/12
See application file for complete search history.

(56) References Cited

U.S. PATENT DOCUMENTS 3,330,575 A * 7/1967 Boudreau ................ B62B 9/26
280/649
6,139,046 A * 10/2000 Aalund .................... B62B 9/20
280/47.38
(Continued)

FOREIGN PATENT DOCUMENTS

CN 2690260 Y 4/2005
CN 2883119 Y 3/2007
(Continued)

OTHER PUBLICATIONS

TW Office Action of application No. 110140105 dated Jan. 9, 2023.
(Continued)

*Primary Examiner* — Steve Clemmons
(74) *Attorney, Agent, or Firm* — Quarles & Brady LLP

(57) ABSTRACT

A basket and a stroller with the basket are disclosed. The stroller includes a frame, a seat and a basket. The seat is disposed on the frame, and the basket is connected to the frame and located under the seat. The basket includes a bottom, a front stopper, a rear stopper and two side stoppers. The front stopper, the rear stopper and the side stoppers are connected to a front side, a rear side, and left and right sides of the bottom respectively. By the movement of the rear stopper with respect to the bottom, the deformation of the rear stopper itself, or the detachable connection of the rear stopper to the bottom, an opening for objects to enter the basket is formed at a rear side of the basket.

7 Claims, 21 Drawing Sheets

(56) References Cited

U.S. PATENT DOCUMENTS

| | | | | |
|---|---|---|---|---|
| 6,224,073 | B1* | 5/2001 | Au | B62B 9/142 |
| | | | | 280/47.38 |
| 7,011,318 | B2* | 3/2006 | Chen | B62B 9/26 |
| | | | | 280/47.38 |
| 7,588,263 | B2* | 9/2009 | Yang | B62B 9/26 |
| | | | | 280/642 |
| 8,794,492 | B2* | 8/2014 | Ballou | B60R 11/00 |
| | | | | 224/539 |
| 8,857,829 | B2* | 10/2014 | Cheng | B62B 9/26 |
| | | | | 280/47.38 |
| 9,302,694 | B2* | 4/2016 | Velichko | B62B 7/062 |
| 10,011,292 | B2* | 7/2018 | Strawser | B62B 3/1464 |
| 10,940,880 | B2 | 3/2021 | Haut et al. | |
| 10,974,754 | B2* | 4/2021 | Choi | B62B 7/008 |
| 2002/0093157 | A1* | 7/2002 | Turner | B62B 7/08 |
| | | | | 280/47.25 |
| 2002/0109321 | A1 | 8/2002 | Turner | |
| 2004/0222608 | A1 | 11/2004 | Espenshade | |
| 2006/0086444 | A1 | 4/2006 | Yu | |
| 2012/0126511 | A1 | 5/2012 | Winterhalter | |
| 2012/0223496 | A1* | 9/2012 | Ohnishi | B62B 9/104 |
| | | | | 280/79.2 |
| 2016/0167689 | A1* | 6/2016 | Haynes | B62B 3/1464 |
| | | | | 383/16 |
| 2016/0264165 | A1* | 9/2016 | Stokes | B62B 5/0013 |
| 2017/0066466 | A1 | 3/2017 | Hawk et al. | |
| 2020/0339173 | A1* | 10/2020 | Kravchenko | B62B 9/26 |
| 2021/0076794 | A1* | 3/2021 | Benezri | A45F 4/02 |
| 2021/0188339 | A1 | 6/2021 | Fu | |

FOREIGN PATENT DOCUMENTS

| | | | | | |
|---|---|---|---|---|---|
| CN | 101332827 | A | * | 12/2008 | B62B 9/26 |
| CN | 201446920 | U | | 5/2010 | |
| CN | 201849507 | U | | 6/2011 | |
| CN | 202608853 | U | * | 12/2012 | B62B 9/26 |
| CN | 103359143 | A | * | 10/2013 | B62B 7/008 |
| CN | 204527266 | U | | 8/2015 | |
| CN | 205022659 | U | | 2/2016 | |
| CN | 109501847 | A | * | 3/2019 | B62B 9/10 |
| CN | 109693702 | A | * | 4/2019 | B62B 9/26 |
| CN | 110884552 | A | | 3/2020 | |
| CN | 211167066 | U | * | 8/2020 | |
| CN | 211391434 | U | | 9/2020 | |
| CN | 211722699 | U | | 10/2020 | |
| JP | 2009247847 | A | | 10/2009 | |
| JP | 2012218575 | A | | 11/2012 | |
| JP | 3184813 | U | | 7/2013 | |
| JP | 2016202769 | A | | 12/2016 | |
| JP | 2018144692 | A | | 9/2018 | |
| JP | 2018144692 | A | * | 9/2018 | |
| KR | 20120115140 | A | * | 10/2012 | |
| TW | M301821 | U | | 12/2006 | |
| TW | M459155 | U | * | 8/2013 | |

OTHER PUBLICATIONS

JP Office Action of application No. 2021-176301 dated Sep. 20, 2022.

AU Office Action of application No. 2021258027 dated Feb. 4, 2023.

Examination Report, AU Patent Application No. 2021258027, Jan. 10, 2024.

Office Action, Australia Patent Application No. 2021258027, Feb. 9, 2024.

Office Action, Japan Patent Application No. 2023-072874, Feb. 5, 2024.

* cited by examiner

BASKET AND STROLLER WITH THE BASKET

CROSS-REFERENCE TO RELATED APPLICATIONS

The present application claims priority to Chinese Patent Application No. 202022440002.6, filed on Oct. 28, 2020, the contents of which are incorporated by reference in their entireties herein.

TECHNICAL FIELD

The present disclosure relates to the field of baby carriers, in particular to a basket and a stroller with the basket.

BACKGROUND

The development of science and technology and humanistic progress provide people with a wide range of consumer goods, one kind of which is baby carrier. Baby carriers play an important role when adults and babies go out. On one hand, they free adults' hands and reduce the burden, and on the other hand, they provide a more comfortable posture for the babies. so baby carriers are popular among consumers year by year. With the increasing demand for baby carriers, the structure of baby carriers has been improved year by year to meet the material and cultural needs of people.

Stroller is a common type of baby carriers. An existing stroller includes a frame, a seat and a basket located under the seat. With the help of the basket, the space of the stroller can be used to carry more objects and free people's hands.

SUMMARY

One aspect of the present disclosure provides a basket of the utility model, which includes a bottom, a front stopper, a rear stopper and two side stoppers. The front stopper, the rear stopper and the side stoppers are connected to a front side, a rear side, and left and right sides of the bottom respectively. The rear stopper is configured such that an opening for objects to enter the basket from back to front is formed at a rear side of the basket by at least one of a movement of the rear stopper with respect to the bottom, a deformation of the rear stopper, or a detachable connection of the rear stopper to the bottom.

In an embodiment, the rear stopper is pivotally connected at two sides thereof to the side stopper. The rear stopper is pivotable with respect to the bottom so as to be switched between a stopping position intersecting the bottom and a flat position parallel to the bottom. Or, the rear stopper being pivotable with respect to the bottom so as to be switched between a stopping position intersecting the bottom and a stowed position parallel to the bottom. When the rear stopper is in the flat position or in the stowed position, the opening of the basket is formed.

In an embodiment, the rear stopper has a rigid structure, and the rear stopper is pivotable downwardly with respect to the bottom to be switched between the stopping position and the flat position in the same plane with the bottom.

In an embodiment, the bottom includes a shielding member, and the shielding member is formed by upwardly bending and extending an end of the bottom and connected to a lower edge of the rear stopper through a connecting member.

In an embodiment, the rear stopper is flexible, and is pivotable upwardly with respect to the bottom to be switched between the stopping position and a stowed position relative to the stopping position. When the rear stopper is in the stopping position, a lower edge of the rear stopper abuts against a surface of the bottom, and when the rear stopper is in the stowed position, a top edge of the rear stopper abuts against the surface of the bottom.

In an embodiment, the rear stopper includes connecting segments provided at two ends thereof respectively, and a stopping segment connected between the connecting segments. The connecting segments are pivotally connected to the side stoppers respectively.

In an embodiment, the rear stopper includes a first magnet structure and the bottom includes a second magnet structure so that when the rear stopper is in the stopping position, the first magnet structure and the second magnet structure are mutually attracted to connect the rear stopper to the bottom.

In an embodiment, the rear stopper includes a male buckle at its bottom, and the bottom includes a female buckle able to be fastened to the male buckle. When the rear stopper is in the stopping position, the male buckle is fastened to the female buckle so that the rear stopper is connected to the bottom.

In an embodiment, the rear stopper has a first zipper and the bottom has a second zipper, and the first zipper is connected to the second zipper by a chain head.

In an embodiment, a carriage bag is provided at a surface of the bottom.

In an embodiment, the basket further includes at least one side insert connected to the left side or right side of the bottom. The rear stopper is provided with a pocket with an opening facing downward on at least one side thereof, and the pocket is correspondingly placed downward over the side insert.

In an embodiment, one end of the side insert is rotatably connected to the bottom, and the side insert is able to be rotated with respect to the bottom to a position where it fits on the side stopper. The side insert is provided with a third magnet structure, and the side stopper is provided with a fourth magnet structure. The side insert is fitted on the side stopper by mutual attraction between the third magnet structure and the fourth magnet structure.

In an embodiment, the rear stopper includes connecting segments provided at two ends thereof respectively, and a stopping segment connected between the connecting segments. One of the connecting segments that corresponds to the side insert includes the pocket, and the other connecting segment being pivotally connected to the bottom. Or, each of the connecting segments includes the pocket.

In an embodiment, the rear stopper has a resilient structure.

In an embodiment, the rear stopper is connected on two sides to the side stoppers, and a telescopic element is connected between each side of the rear stopper and the side stopper. The rear stopper is in a stopping position at the rear side of the bottom when the telescopic element is folded, and is in the same plane with the bottom when the telescopic element expands by pivoting around a pivot line.

In an embodiment, the rear stopper has a separable structure.

In an embodiment, the rear stopper includes a first rear stopper and a second rear stopper detachably connected to each other. The first rear stopper and the second rear stopper are provided adjacent to each other in a left-to-right direction. One side of the first rear stopper is fixedly connected to the side rear stopper, one side of the second rear stopper is fixedly connected to the side rear stopper, and the other side of the first rear stopper and the other side of the second rear stopper are detachably connected.

In an embodiment, the first rear stopper is connected to the second rear stopper by a Velcro or a button.

Another aspect of the present disclosure provides a stroller, which includes a frame, a seat and a basket as described above. The seat is disposed on the frame, and the basket is connected to the frame and located under the seat.

Yet another aspect of the present disclosure provides a basket for a stroller. The basket is located under a seat of the stroller. The basket includes a bottom, side stoppers connected to the bottom at two sides of the bottom, and a rear stopper located at a rear side of the bottom and configured to be placed either in a first position where objects is prevented from falling off the basket, or in a second position where an opening for objects to enter the basket from the rear side of the basket is formed.

BRIEF DESCRIPTION OF THE DRAWINGS

The drawings herein are incorporated in and constitute a part of this specification, illustrate embodiments consistent with the present disclosure, and together with the description, serve to explain the principles of the present disclosure. Understandably, the drawings in the following description are merely some embodiments of the present disclosure. For those of ordinary skill in the art, other drawings can be obtained based on these drawings without creative efforts.

DETAILED DESCRIPTION

In order to explain in detail the technical content and features of the present disclosure, explanation is made by combining with embodiments and the accompanying drawings as follows.

A stroller 100 of the present disclosure includes a frame 10, a seat 20 and a basket 30a-30i. The seat 20 is disposed on the frame 10, and the basket 30a-30i is connected to the frame 10 and located under the seat 20. With the basket 30a-30i, it frees people's hands and uses the space under the seat 20 of the stroller 100 to greatly improve the space utilization of the stroller 100.

Figure 1:
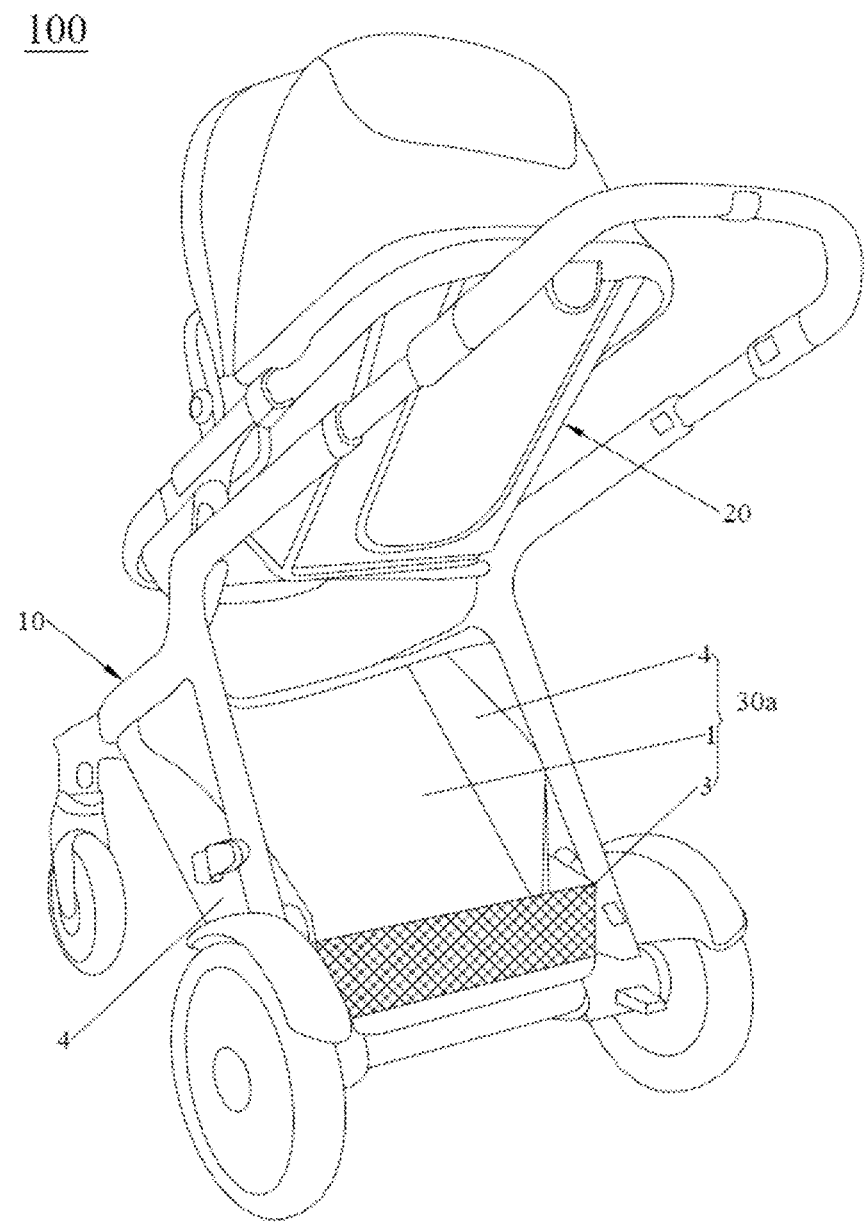
FIG. 1 is a schematic perspective view of a stroller with a basket according to a first embodiment of the present disclosure.

FIG. 1 shows a basket 30a according to a first embodiment of the present disclosure, which is applied to a stroller 100. The basket 30a includes a bottom 1, a front stopper (not shown), a rear stopper 3 and two side stoppers 4. The front stopper, the rear stopper 3 and the side stoppers 4 are connected to the front side, the rear side, and the left and right sides of the bottom 1, respectively. The rear stopper 3 is deformed so that an opening 5 is formed at a rear side of the basket 30a for objects to enter the basket 30a from back to front. Specifically, in this embodiment, the rear stopper 3 has a resilient structure. With the resilient rear stopper 3, when a large object enters the basket 30a from the rear of the basket 30a, the rear stopper 3 is pressed and deformed until the object is completely placed in the basket 30a, and then the rear stopper 3 resiliently returns to its initial stopping position, preventing the object from being lost from the rear.

Figure 2:
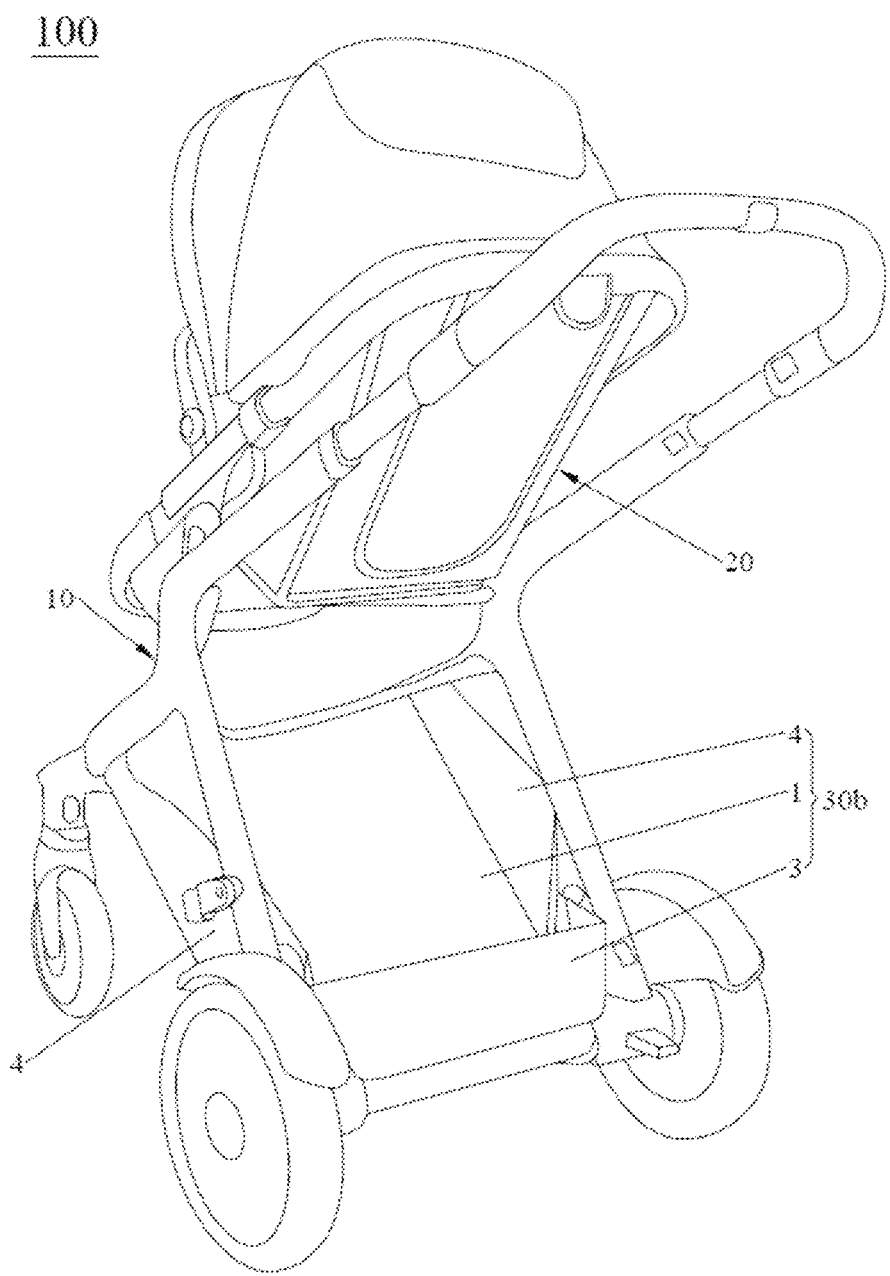
FIG. 2 is a schematic perspective view of a stroller with a basket in a first position according to a second embodiment of the present disclosure.
Figure 3:
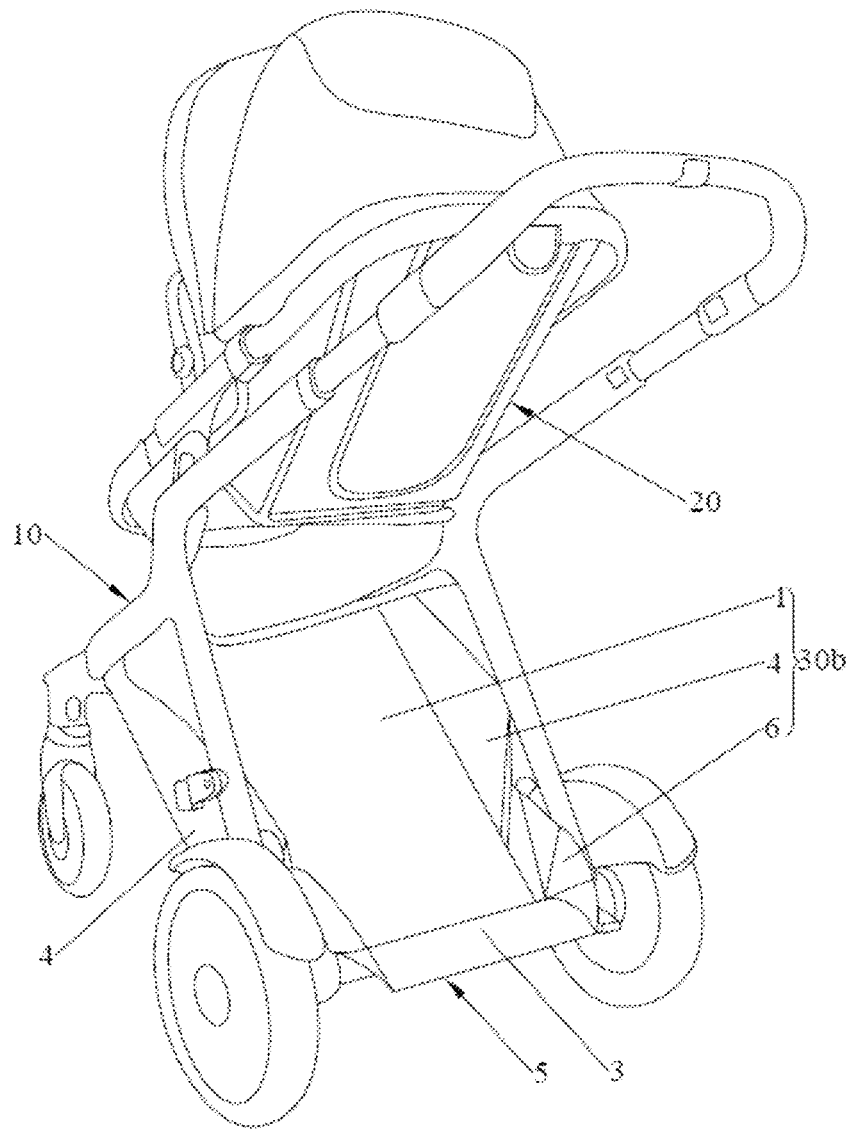
FIG. 3 is a schematic perspective view of the stroller with the basket in a second position according to the second embodiment of the present disclosure.

FIGS. 2-3 show a basket 30b according to a second embodiment of the present disclosure, which is applied to a stroller 100. The structure is basically the same as that of the basket 30a in the first embodiment, which also provides an opening 5 at a rear side of the basket 30b for objects to enter the basket 30b from back to front by deformation of the rear stopper 3. The differences reside in that, in this embodiment, both sides of the rear stopper 3 are connected to the side stoppers 4, and there is a telescopic element 6 connected between each side of the rear stopper 3 and the side stopper 4. As shown in FIG. 2, the rear stopper 3 is placed in a stopping position at the rear side of the bottom 1 when the telescopic element 6 is folded. The telescopic element 6 is pivoted around a pivot line and unfolded so that the rear stopper 3 is in the same plane with the bottom 1, and an opening 5 is formed at the rear side of the basket 30b for objects to enter the basket 30b from back to front. Specifically, the telescopic element 6 is fan-shaped when unfolded, but not limited to this.

Figure 4:
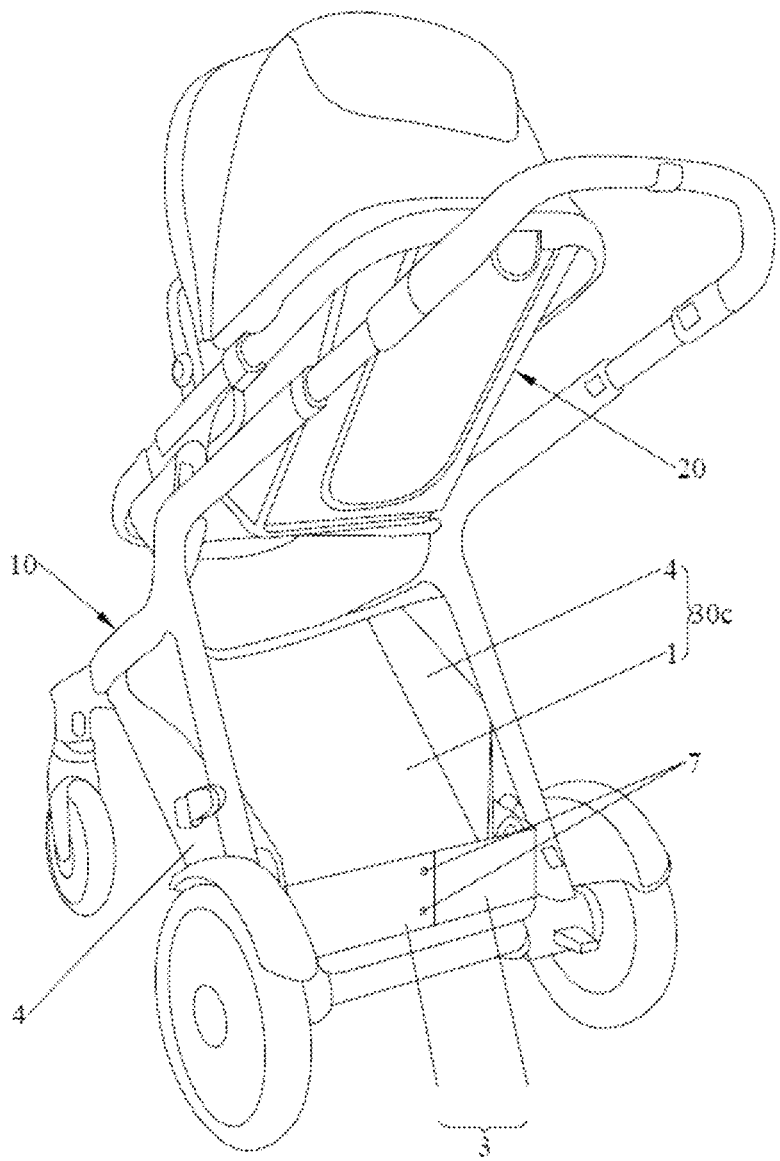
FIG. 4 is a schematic perspective view of a stroller with a basket in a first position according to a third embodiment of the present disclosure.
Figure 5:
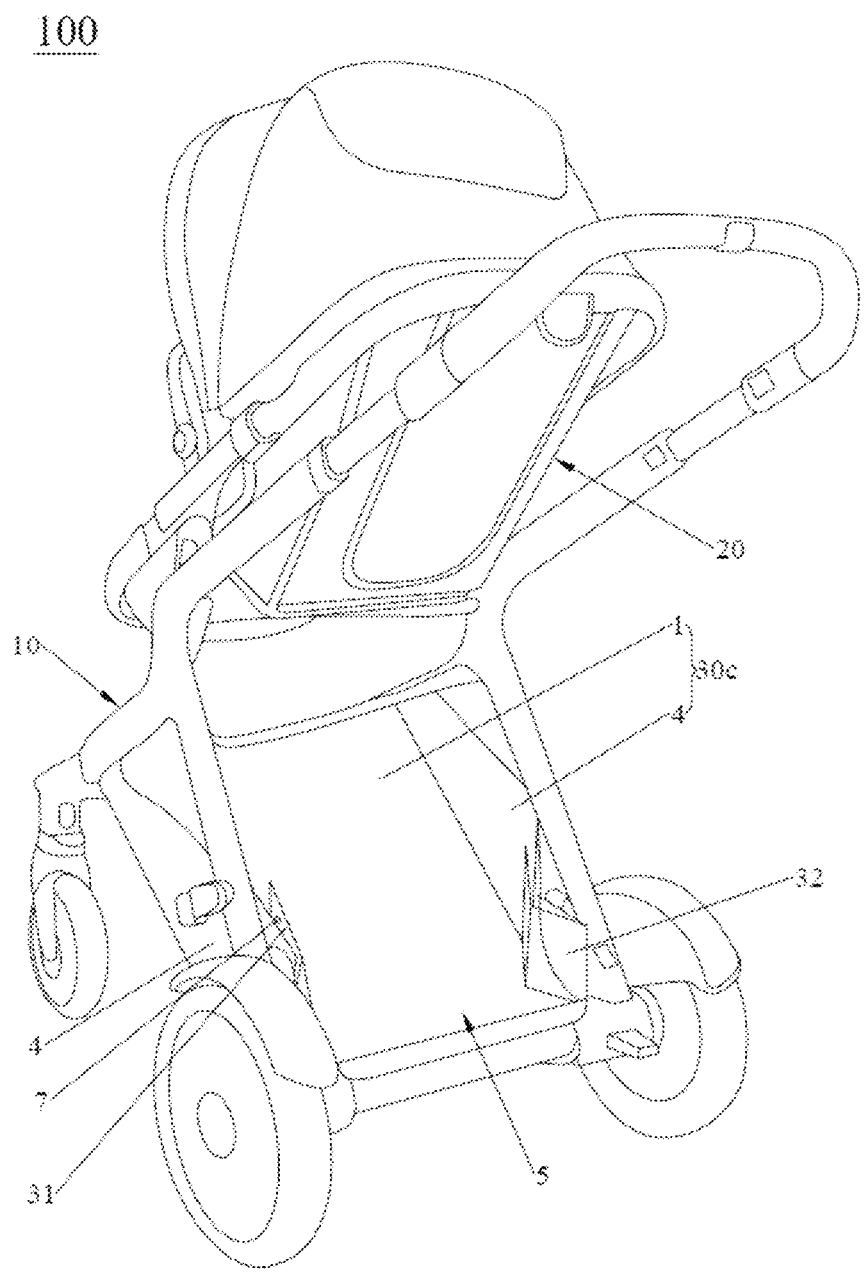
FIG. 5 is a schematic perspective view of the stroller with the basket in a second position according to the third embodiment of the present disclosure.

FIGS. 4-5 show a basket 30c according to a third embodiment of the present disclosure, which is applied to a stroller 100. The structure is basically the same as that of basket 30a of the first embodiment, which also provides an opening 5 at a rear side of the basket 30c for objects to enter the basket 30c from back to front by deformation of the rear stopper 3. The differences reside in that, in this embodiment, the rear stopper 3 has a separate structure. The rear stopper 3 includes a first rear stopper 3a and a second rear stopper 3b that are detachably connected to each other and disposed adjacent to each other along a left-to-right direction. One side of the first rear stopper 3a is fixedly connected to one side stopper 4, one side of the second rear stopper 3b is fixedly connected to the other side stopper 4, and the other side of the first rear stopper 3a is detachably connected to the other side of the second rear stopper 3b. Specifically, the first rear stopper 3a and the second rear stopper 3b are connected by buttons 7. Obviously, in other embodiments, the first rear stopper 3a and the second rear stopper 3b are connected by Velcro, but not limited thereto.

Figure 6:
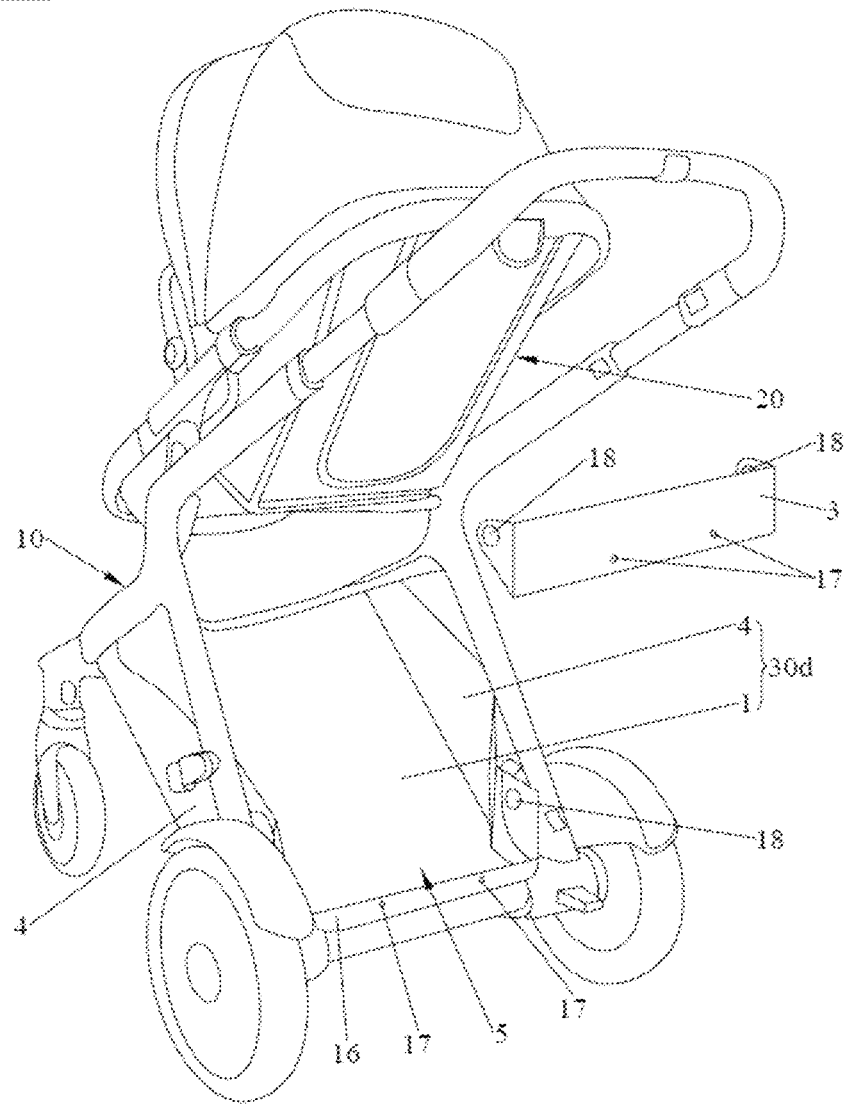
FIG. 6 is a schematic perspective view of a stroller with a basket according to a fourth embodiment of the present disclosure.

FIG. 6 shows a basket 30d according to a fourth embodiment of the present disclosure, which is applied to a stroller 100. The basket 30d includes a bottom 1, a front stopper, a rear stopper 3 and two side stoppers 4. The front stopper, the rear stopper 3 and the side stoppers 4 are connected to the front side, the rear side, and the left and right sides of the bottom 1. The rear stopper 3 is detachably connected to the bottom 1. When the rear stopper 3 is removed, an opening 5 for objects to enter the basket from back to front is formed at a rear side of the basket 30d. In this embodiment, the bottom 1 also includes a shielding member 16 which is formed by upwardly bending and extending an end of the bottom 1. A gap between the rear stopper 3 and the bottom 1 is formed when the rear stopper 3 is connected to the rear side of the bottom 1, and can be shielded by the shielding member 16 to prevent objects from slipping out of the gap. Specifically, the shielding member 16 is connected to a lower edge of the rear stopper 3 by a first connecting member 17, which may be, for example, a fastener or Velcro, but not limited thereto. In this embodiment, both sides of the rear stopper 3 are further detachably connected to the side stoppers 4. Specifically, each side of the rear stopper 3 is connected to the side stopper 4 by a second connecting member 18 to achieve a detachable connection. For example, the second connecting member 18 is a magnet or a fastener, and not limited thereto.

Figure 7:
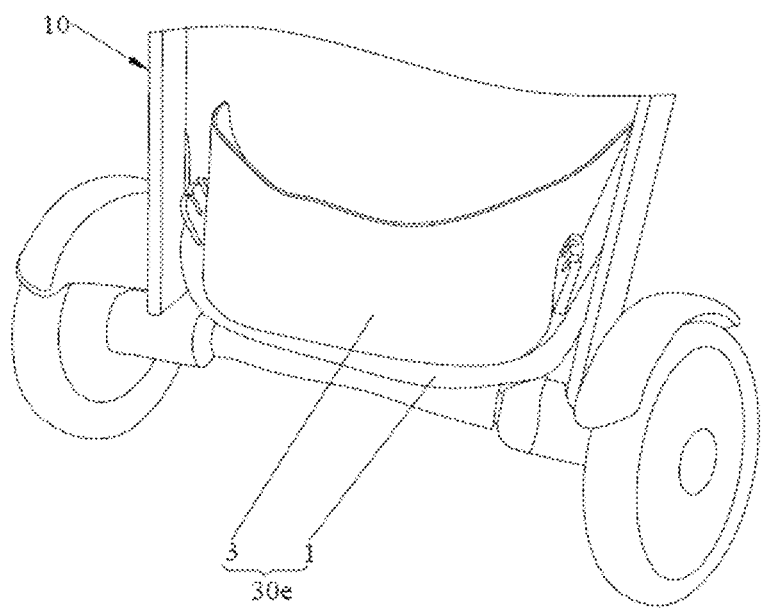
FIG. 7 is a schematic perspective view of part of a stroller with a basket according to a fifth embodiment of the present disclosure.
Figure 8:
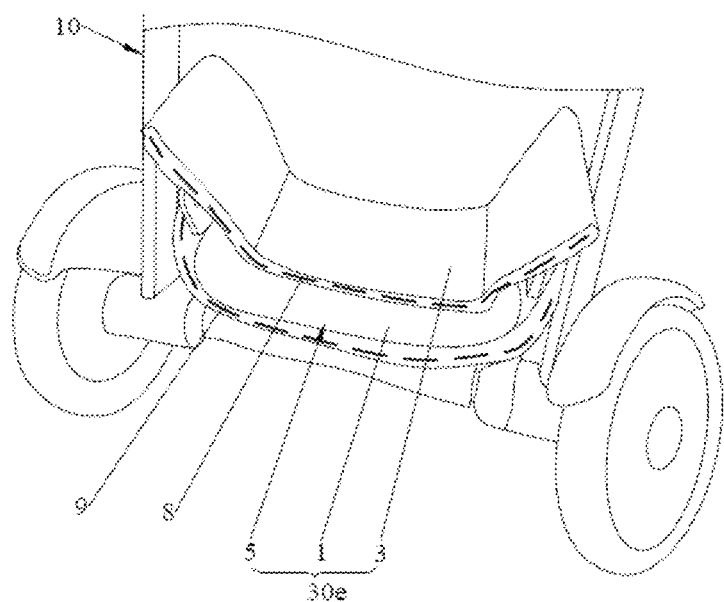
FIG. 8 is a schematic perspective view of part of the stroller with the basket according to the fifth embodiment of the present disclosure, where a rear stopper is removed from the basket.
Figure 9:
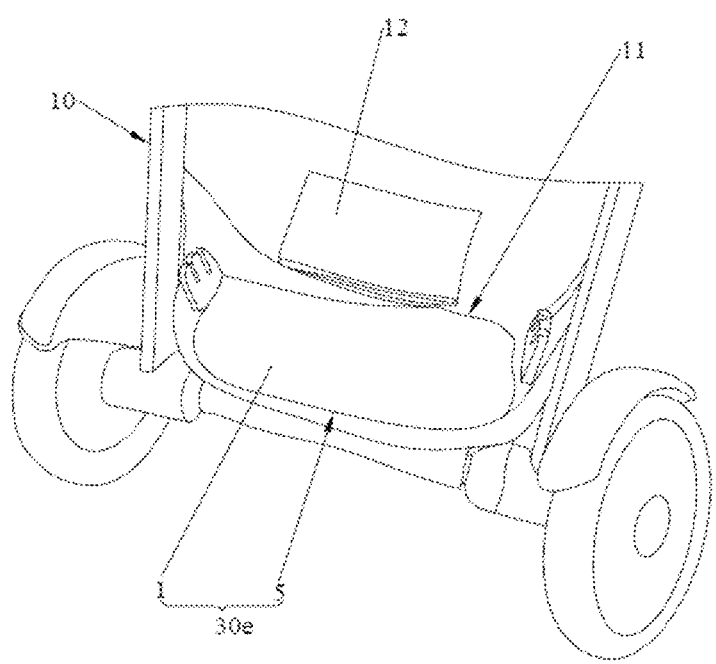
FIG. 9 is a schematic perspective view of part of the stroller with the basket according to the fifth embodiment of the present disclosure, where the rear stopper is placed in a carriage bag.

FIGS. 7-9 show a basket 30e according to a fifth embodiment of the present disclosure, which is applied to a stroller 100. The structure is basically the same as that of the basket 30d of the fourth embodiment, in which the rear stopper 3 is detachably connected to the bottom 1, and an opening 5 is formed at a rear side of the basket 30e for objects to enter the basket 30e from back to front when the rear stopper 3 is removed. The differences reside in that, in this embodiment, a first zipper 8 is provided at the bottom of the rear stopper 3, and a second zipper 9 is provided at a surface of the bottom 1. The first zipper 8 is connected to the second zipper 9 by a chain head (not shown). A carriage bag 11 is further provided at the surface of the bottom 1. In this embodiment, the rear stopper 3 also has a flexible structure, and when the rear stopper 3 is removed, the rear stopper 3 can be folded into the carriage bag 11. In this embodiment, the basket 30e is also includes a storage bag 12, the rear stopper 3 can be folded first into the storage bag 12 (as shown in FIG. 9), and then the storage bag 12 is put into the carriage bag 11, which makes storage more convenient.

Figure 10:
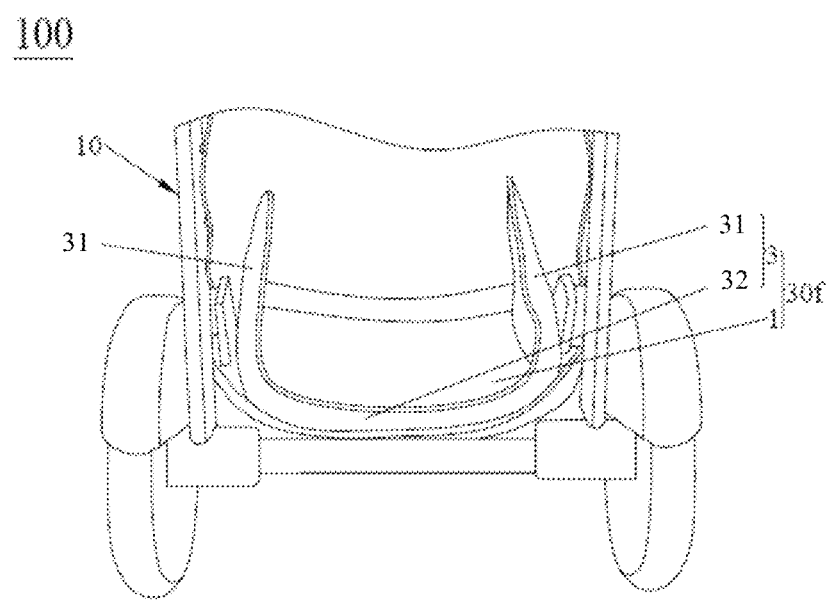
FIG. 10 is a schematic perspective view of part of a stroller with a basket according to a sixth embodiment of the present disclosure.
Figure 11:
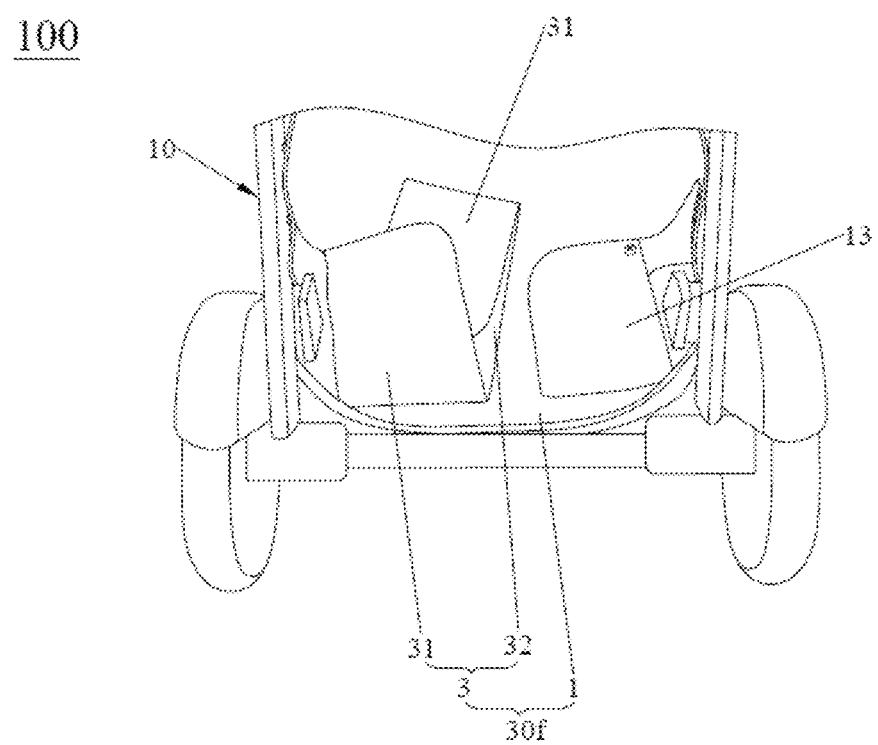
FIG. 11 is a schematic perspective view of part of the stroller with the basket according to the sixth embodiment of the present disclosure, where a rear stopper is separated from a side stopper.
Figure 12:
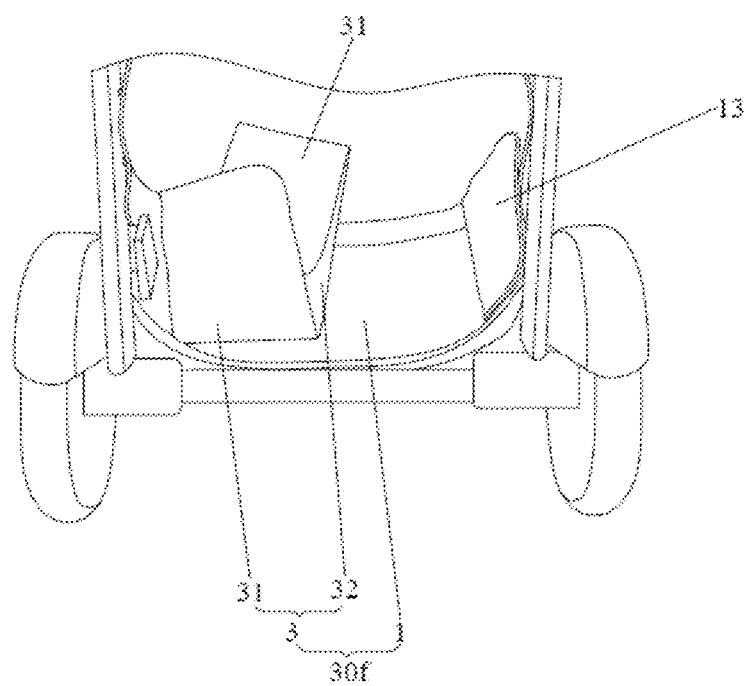
FIG. 12 is a schematic perspective view of part of the stroller with the basket according to the sixth embodiment of the present disclosure, where a side inset is connected to the side stopper.
Figure 13:
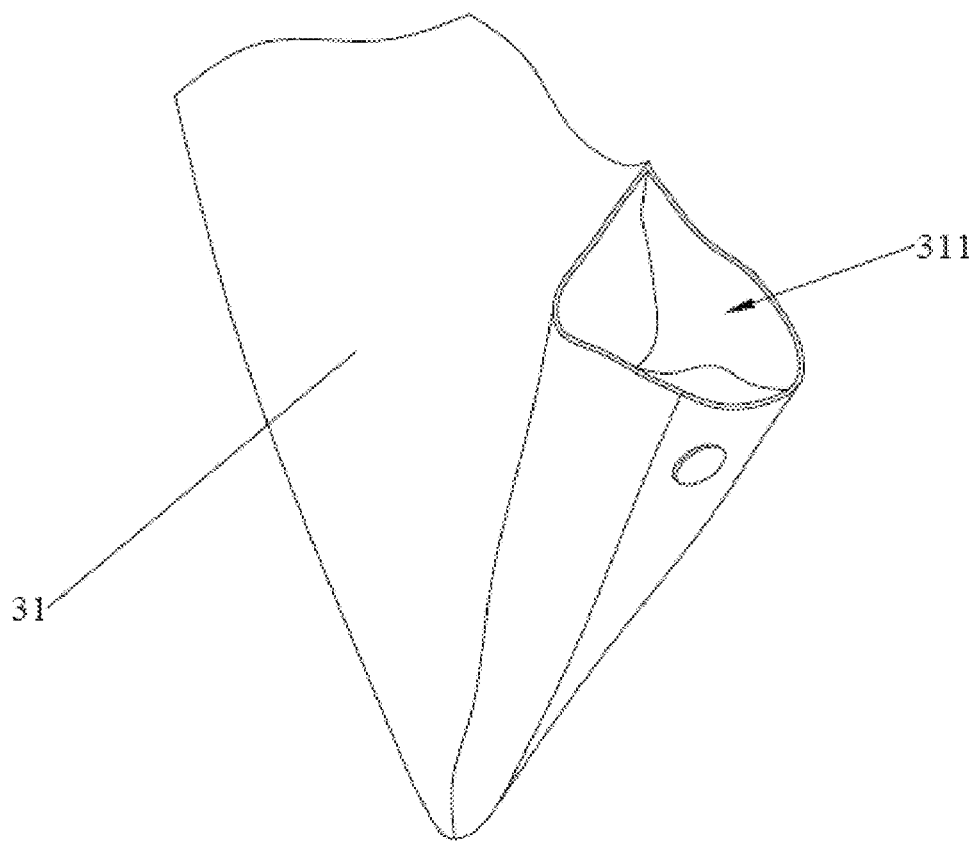
FIG. 13 is a schematic perspective view of part of the rear stopper of the basket according to the sixth embodiment of the present disclosure, where the rear stopper is separated.

FIGS. 10 to 13 show a basket 30f according to a sixth embodiment of the present disclosure, which is applied to a stroller 100. The structure is basically the same as that of the basket 30d of the fourth embodiment, in which the rear stopper 3 is detachably connected to the bottom 1, and an opening 5 is formed at a rear side of the basket 30f for objects to enter the basket 30f from back to front when the rear stopper 3 is removed. The differences reside in that, in this embodiment, the basket 30f also includes a side insert 13, which is provided on the right side of the bottom 1. Obviously, the side insert can be provided on the left side of the bottom 1, and not limited thereto. The rear stopper 3 includes two connecting segments 31 and a stopping segment 32 connected between the two connecting segments 31. The connecting segment 31 of the rear stopper 3 corresponding to the side insert 13 has a pocket 311 with an opening facing downward, and the pocket 311 is placed downward over the side insert 13. The other connecting segment 31 of the rear stopper 3 is rotatably connected to the bottom 1. For example, one side of this connecting segment 31 is fixed to the bottom 1 by sewing, so that the connecting segment 31 can be rotated with respect to the bottom 1, but not limited to this. One end of the side insert 13 is rotatably connected to the bottom 1, and can be rotated with respect to the bottom 1 to a position where it fits on the side stopper 4. The side insert 13 is provided with a third magnet structure (not shown), so that it can fit on the frame 10 by the attraction between the third magnet structure and the frame 10. The connecting segment 31 of the rear stopper 3 that is not placed over the side insert 13 is provided with a fourth magnet structure (not shown), and the rear stopper 3 is fitted to the frame 10 by the attraction between the fourth magnet structure and the frame 10. As such, the rear stopper 3 is upright on the bottom 1, and the stopping segment 32 blocks the opening 5 of the basket 30f (as shown in FIG. 10). When a user needs to put objects into the basket 30f through the opening 5, the connecting segment 31 with the pocket 311 is lifted upward, so that the connecting segment 31 is separated away from the side insert 13. The rear stopper 3 can be folded downward along the connection between the other connecting segment 31 and the bottom 1 so that the rear stopper 3 overlaps with the bottom 1, thus exposing the opening 5 for objects to be put in. In addition, in other embodiments, the basket 30f can also include two side inserts 13 connected to the left and right sides of the bottom 1 respectively, and the connecting segments 31 on the left and right sides of the rear stopper 3 are respective provided with pockets 311 with openings facing downward. The pockets 311 are placed downwardly over the side inserts 13 correspondingly. One end of the side insert 13 is rotatably connected to the bottom 1, and can be rotated with respect to the bottom 1 to a position where it fits on the side stopper 4. The side insert 13 is provided with a third magnet structure (not shown), and the side stopper 4 or the frame 10 is provided with a fourth magnet structure (not shown). The side inserts 13 is fitted on the side stopper 4 or the frame 10 by the mutual attraction between the third magnet structure and the fourth magnet structure. When the opening 5 needs to be exposed, the two connecting segments 31 are lifted upward and separated away from the side inserts 13, and the rear stopper 3 is then folded. Obviously, in an embodiment, the bottom 1 can be provided with a storage bag for the folded rear stopper 3.

Figure 14:
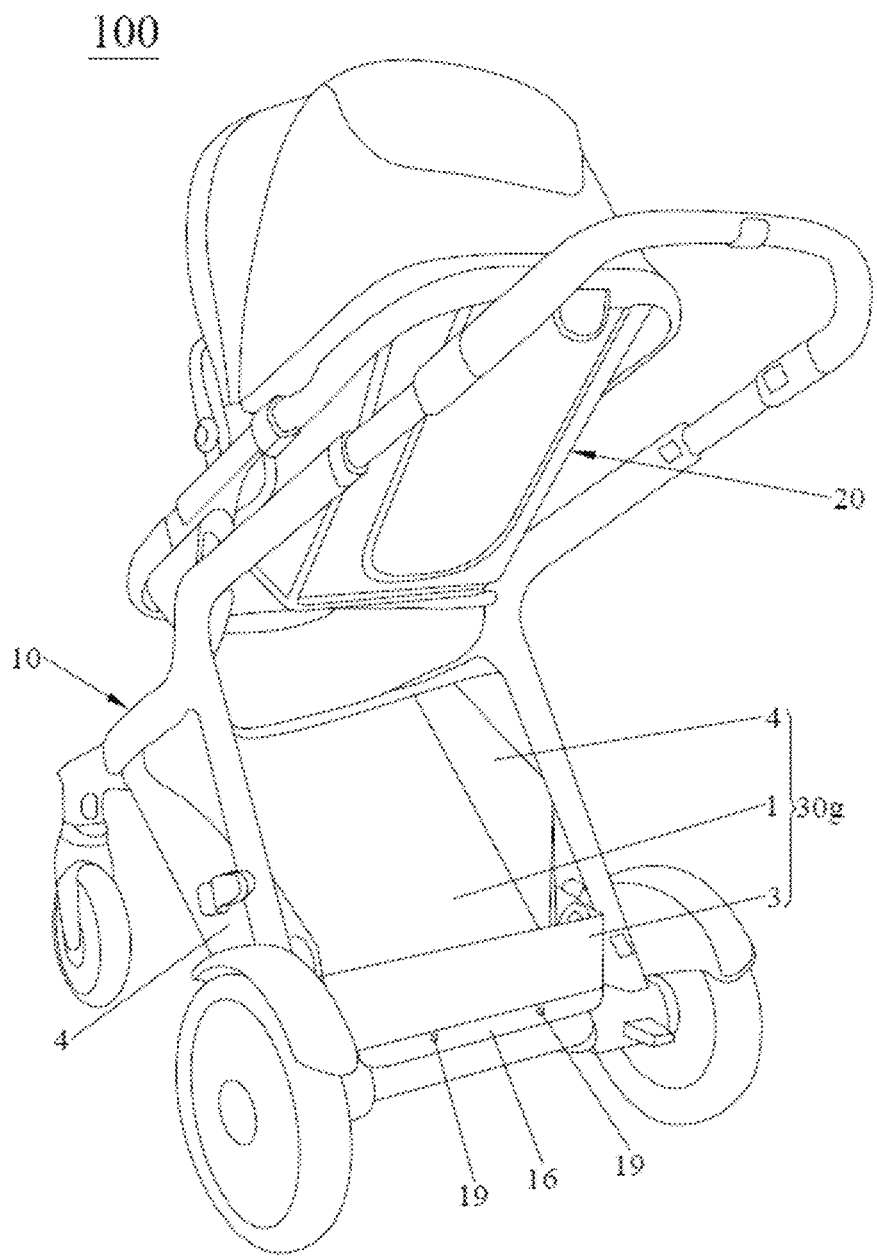
FIG. 14 is a schematic perspective view of a stroller with a basket according to a seventh embodiment of the present disclosure, where a rear stopper is in a stopping position.
Figure 15:
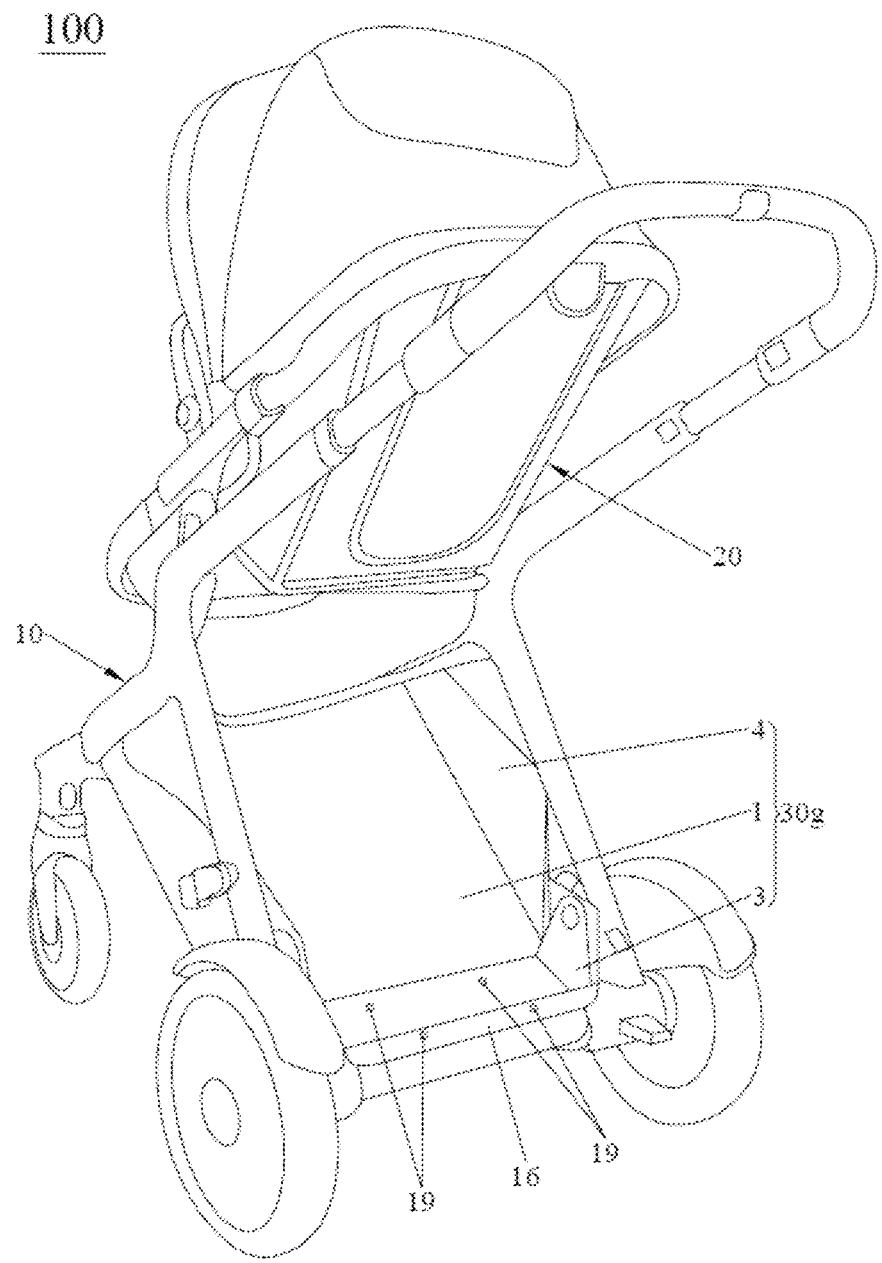
FIG. 15 is a schematic perspective view of the stroller with the basket according to the seventh embodiment of the present disclosure, where the rear stopper is in a flat position.
Figure 16:
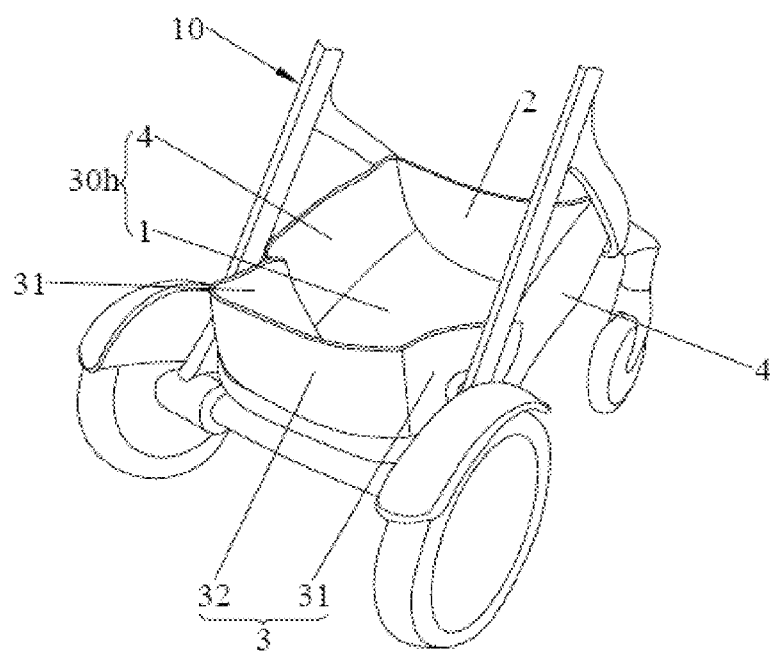
FIG. 16 is a schematic perspective view of part of a stroller with a basket according to an eighth embodiment of the present disclosure.
Figure 17:
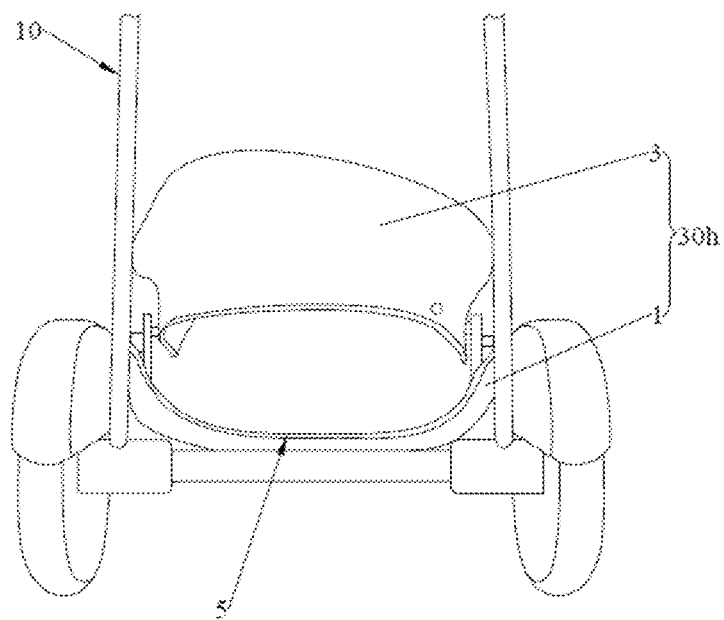
FIG. 17 is a is a schematic perspective view of part of the stroller with the basket according to the eighth embodiment of the present disclosure, where a rear stopper is pivoted upward to a flat position.
Figure 18:
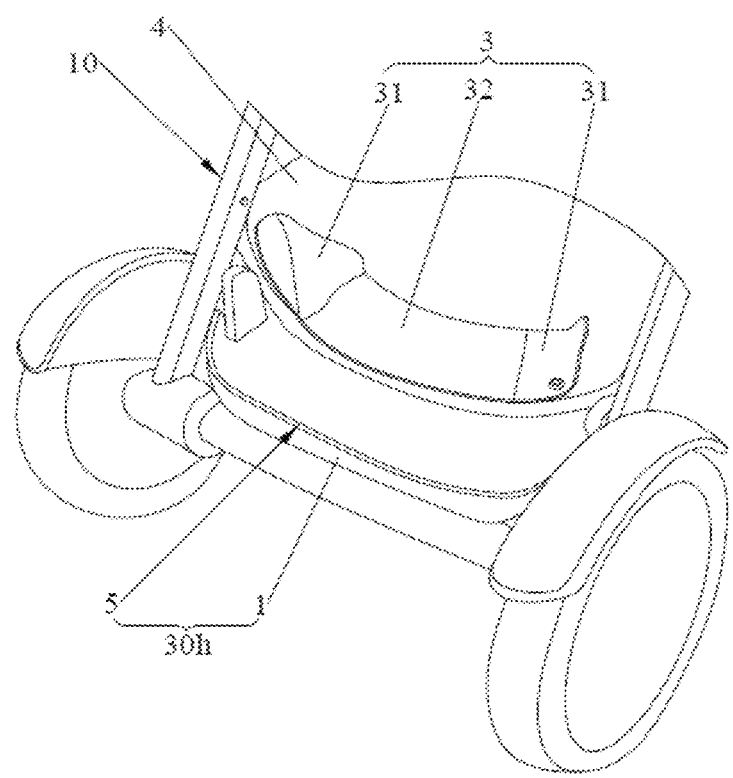
FIG. 18 is a schematic perspective view of part of the stroller with the basket according to the eighth embodiment of the present disclosure, where the rear stopper is closely fitted on a bottom.
Figure 19:
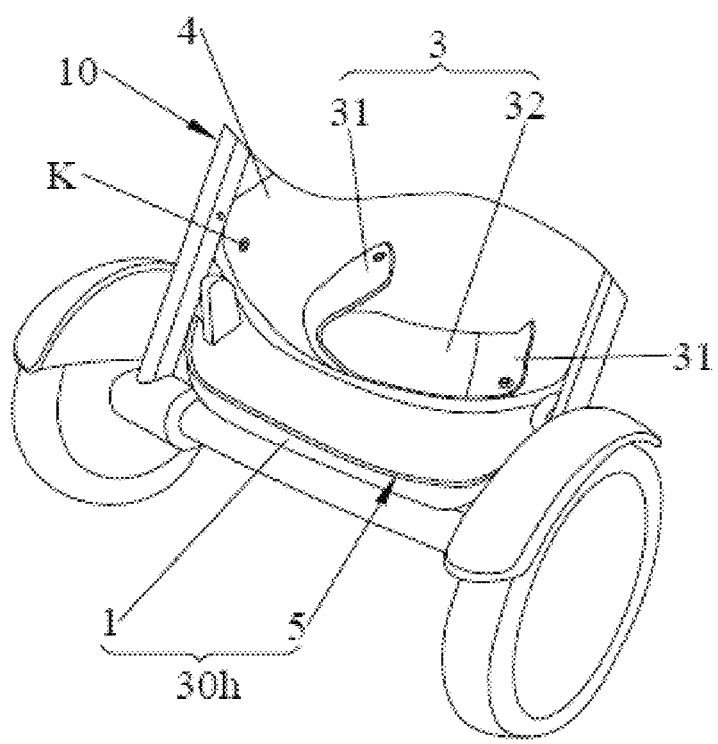
FIG. 19 is a schematic perspective view of part of the stroller with the basket according to the eighth embodiment of the present disclosure, where the rear stopper is separated form a side stopper.

FIGS. 14 to 15 show a basket 30g according to the seventh embodiment of the present disclosure, which is applied to a stroller 100. The basket 30g includes a bottom 1, a front stopper, a rear stopper 3 and two side stoppers 4. The front stopper, the rear stopper 3 and the side stoppers 4 are connected to the front side, the rear side, and the left and right sides of the bottom 1. The rear stopper 3 moves with respect to the bottom 1 so that an opening 5 is formed at a rear side of the basket 30g for objects to enter the basket 30g from back to front. Specifically, in this embodiment, each side of the rear stopper 3 is pivotally connected to the side stoppers 4, and the rear stopper 3 is pivoted with respect to the bottom 1 around a pivot point K to be switched between a stopping position intersecting the bottom 1 and a flat position parallel to the bottom 1. When the rear stopper 3 is in the flat position, the opening 5 of the basket 30g is formed. Specifically, the rear stopper 3 has a rigid structure and is pivoted downward with respect to the bottom 1 to be switched between the stopping position and the flat position in the same plane as the bottom 1. Further, the bottom 1 includes a shielding member 16 formed by upwardly bending and extending an end of the bottom 1. When the rear stopper is in the stopping position, it shields a gap between the rear stopper 3 and the bottom 1 to prevent objects from directly slipping out of the gap. When the rear stopper 3 is in the stopping position, the shielding member 16 is connected to a lower edge of the rear stopper 3 by a third connecting member 19, which may be, for example, a fastener or Velcro, and not limited thereto.

FIGS. 16 to 19 show a basket 30h according to the eighth embodiment of the present disclosure, which is applied to a stroller 100. The basket 30h includes a bottom 1, a front stopper 2, a rear stopper 3 and two side stoppers 4. The front stopper 2, the rear stopper 3 and the side stoppers 4 are connected to the front side, the rear side, and the left and right sides of the bottom 1. The structure is basically the same as that of the basket 30g of the seventh embodiment, in which the rear stopper 3 is pivoted around a pivot point K with respect to the bottom 1 so that an opening 5 is formed at a rear side of the basket 30h for objects to enter the basket 30h from back to front. The differences reside in that, in this embodiment, the rear stopper 3 has a flexible structure and is pivotable with respect to the bottom 1 so as to be switched between a stopping position and a stowed position relative to the stopping position. Specifically, the rear stopper 3 includes connecting segments 31 at two ends and pivotally connected to a pivot point K, and a stopping segment 32 connected between the two connecting segments 31. The pivot point K is disposed on the side stopper 4, and it is understandable that, in other embodiments, the pivot point K may be disposed on the frame 10, and thus the arrangement of the pivot point is not limited. When the rear stopper 3 is in the stopping position, a bottom edge of the rear stopper 3 can abut against the surface of the bottom 1, and the stopping segment 32 blocks the opening 5. When the rear stopper 3 is in the stowed position, a top edge of the rear stopper 3 abuts against the bottom 1. The rear stopper 3 can be folded along the junction of the connecting segment 31 and the stopping segment 32, so that the stopping segment 32 can be lowered and flattened on the bottom 1 to expose the opening 5. The rear stopper 3 has a first magnet structure (not shown) and the bottom 1 has a second magnet structure (not shown). When the rear stopper 3 is in the stopping position, the first magnetic structure and the second magnetic structure are mutually attracted to connect rear stopper 3 to the bottom 1.

Figure 20:
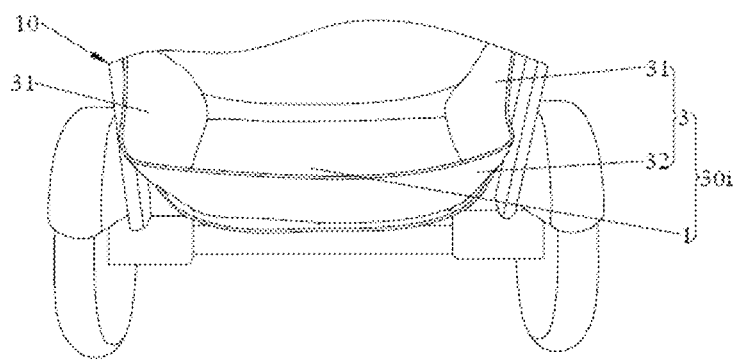
FIG. 20 is a schematic perspective view of part of a stroller with a basket according to a ninth embodiment of the present disclosure.
Figure 21:
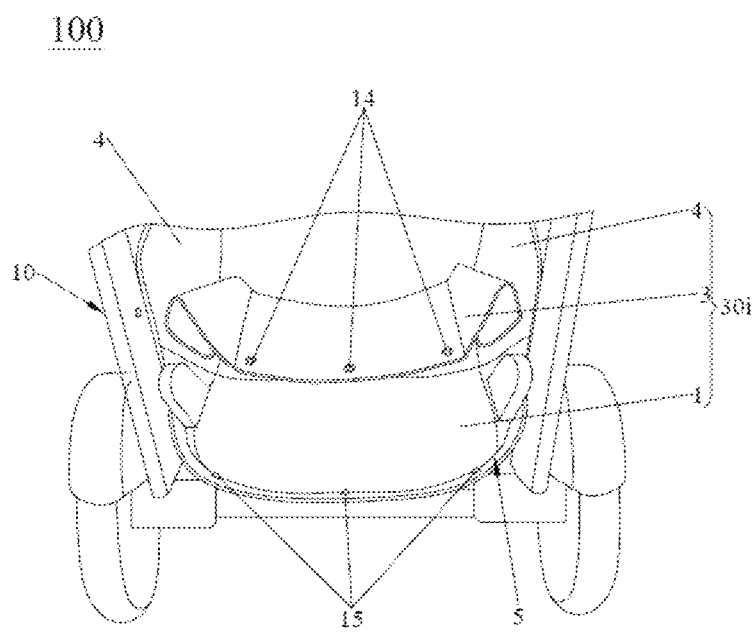
FIG. 21 is a schematic perspective view of part of the stroller with the basket according to the ninth embodiment of the present disclosure, where a rear stopper is closely fitted on a bottom.

FIGS. 20 to 21 show a basket 30i according to the ninth embodiment of the present disclosure, which is applied to a stroller 100. The structure is basically the same as that of the basket 30g of the seventh embodiment. The differences reside in that, in this embodiment, the rear stopper 3 includes a male buckle 14 at its bottom, and the bottom 1 includes a female buckle 15 that is fastened to the male buckle 14. When the rear stopper 3 is in the stopping position, the male buckle 14 is fastened to the female buckle 15 so that the rear stopper 3 is connected to the bottom 1. Obviously, in other embodiments, the bottom of the rear stopper 3 may include both a first magnet structure and the male buckle 14, and the bottom 1 includes both a second magnet structure and the female buckle 15. The rear stopper 3 and the bottom 1 are connected by mutual attraction between the first magnet structure and the second magnet structure, and by the fastening between the male buckle 14 and the female buckle 15, thereby making the connection between the rear stopper 3 and the bottom 1 more tightly, and thus the connection is not limited to the above.

Compared with the prior art, according to the basket 30a-30i of the present disclosure, by connecting the front stopper, the rear stopper 3 and side stoppers 4 to the front side, the rear side, and the left and right sides of the bottom 1, the objects in the baskets 30a-30i are unlikely to be lost. By the movement of the rear stopper 3 with respect to the bottom 1 or the deformation of the rear stopper 3 itself, an opening 5 is formed at the rear side of the basket 30a-30i. Alternatively, by the detachable connection of the rear stopper 3 to the bottom 1, an opening 5 is formed at the rear side of the basket 30a-30i when the rear stopper 3 is removed. With the opening 5, it is convenient for objects to enter the basket 30a-30i from back to front. Especially for large objects, it is more convenient to enter the basket directly from the rear side, overcoming the defect that a rear side of a conventional basket hinders the entry of objects. Particularly when people choose to travel with two carriers, i.e., a stroller 100 and a baby basket, the baby basket, when not used, can be placed in the basket with above three structures.

What is disclosed above relates only to embodiments of the present disclosure, which cannot be used to limit the scope of the rights of the present disclosure, and any equivalent change made based on the claims of the application should be covered by the present disclosure.

What is claimed is:

1. A basket applicable to a stroller, the basket comprising a bottom, a front stopper, a rear stopper and two side stoppers, the front stopper, the rear stopper and the side stoppers being connected to a front side, a rear side, and left and right sides of the bottom respectively,
wherein each of two lateral ends of the rear stopper is pivotally connected to a respective side stopper, the rear stopper is pivotable upwardly with respect to the bottom to be switched from a stopping position to a receiving position, and when the rear stopper is in the receiving position, an opening for objects to enter the basket from back to front is formed at a rear side of the basket.

2. The basket according to claim 1, wherein the bottom comprises a shielding member, and the shielding member is formed by upwardly bending and extending a rear end of the bottom and connected to a lower edge of the rear stopper through a connecting member.

3. The basket according to claim 1, wherein the rear stopper is flexible, when the rear stopper is in the stopping position, a lower edge of the rear stopper abuts against a surface of the bottom, and when the rear stopper is in the receiving position, a top edge of the rear stopper abuts against the surface of the bottom.

4. The basket according to claim 3, wherein the rear stopper comprises two connecting segments provided at two ends thereof respectively, and a stopping segment connected between the two connecting segments, each of the two connecting segments being pivotally connected to a respective side stopper.

5. The basket according to claim 3, wherein the rear stopper comprises a first magnet structure and the bottom comprises a second magnet structure so that when the rear stopper is in the stopping position, the first magnet structure and the second magnet structure are mutually attracted to connect the rear stopper to the bottom.

6. The basket according to claim 3, wherein the rear stopper comprises a male buckle at its bottom, and the bottom of the basket comprises a female buckle able to be fastened to the male buckle, when the rear stopper is in the stopping position, the male buckle being fastened to the female buckle so that the rear stopper is connected to the bottom.

7. The basket according to claim 1, wherein the rear stopper has a separable structure.

\* \* \* \* \*